United States Patent
Sun

(10) Patent No.: US 9,545,676 B2
(45) Date of Patent: Jan. 17, 2017

(54) GENERAL-PURPOSE MULTIPLE-CUTTING EDGE DRILL

(75) Inventor: Jianing Sun, Shanghai (CN)

(73) Assignees: NINGBO HUAREN TOOLS CO., LTD., Ningbo, Zhejiang (CN); TEST RITE INTERNATIONAL COMPANY LIMITED, Taipei (TW)

( * ) Notice: Subject to any disclaimer, the term of this patent is extended or adjusted under 35 U.S.C. 154(b) by 547 days.

(21) Appl. No.: 13/397,849

(22) Filed: Feb. 16, 2012

(65) Prior Publication Data

US 2013/0017029 A1 Jan. 17, 2013

(30) Foreign Application Priority Data

Jul. 11, 2011 (CN) .......................... 2011 2 0243483

(51) Int. Cl.
B23B 51/02 (2006.01)
(52) U.S. Cl.
CPC .......... *B23B 51/02* (2013.01); *B23B 2251/085* (2013.01); *B23B 2251/14* (2013.01); *B23B 2251/18* (2013.01); *Y10T 408/909* (2015.01)
(58) Field of Classification Search
CPC ............... B23B 27/005; B23B 2251/04; B23B 2251/08; B23B 2251/085; B23B 2251/44
USPC ................ 408/215, 223, 227, 228, 229, 230
See application file for complete search history.

(56) References Cited

U.S. PATENT DOCUMENTS

| 3,387,511 | A | * | 6/1968 | Ackart, Sr. et al. | .......... 408/230 |
| 4,400,119 | A | * | 8/1983 | Clement | ....................... 408/230 |
| 5,442,979 | A | * | 8/1995 | Hsu | ............................... 76/108.6 |
| 7,018,145 | B2 | * | 3/2006 | Mast et al. | ..................... 408/233 |
| 8,157,028 | B2 | * | 4/2012 | Kersten | ......................... 175/427 |
| 2009/0317202 | A1 | * | 12/2009 | Zhu | ......................... B23B 51/02 408/230 |
| 2011/0103909 | A1 | * | 5/2011 | Krenzer | ....................... 408/227 |
| 2011/0200403 | A1 | * | 8/2011 | Gruber | ......................... 408/1 R |

FOREIGN PATENT DOCUMENTS

CN 201267891 7/2009
CN 200820165518.0 † 7/2009

OTHER PUBLICATIONS

English Translation of CN 201267891, Jul. 2009.*

(Continued)

*Primary Examiner* — Sunil K Singh
*Assistant Examiner* — Alan Snyder
(74) *Attorney, Agent, or Firm* — Vierra Magen Marcus LLP

(57) ABSTRACT

A general-purpose multiple-cutting edge drill includes: a drill point (1); a drill body (2); margins (3) located on an outer wall of the drill body (2); two lips, wherein, if viewed from an axial direction, from out to inside, each of the two lips successively includes an outer cutting edge (11), an arc cutting edge (12) and an inner cutting edge (13); a chisel edge (14); outer peaks (15) formed by intersection of the outer cutting edges (11) and the arc cutting edges (12); a center peak (16) formed by intersection of two inner flank surfaces and two split surfaces. Moreover, an included angle between the inner cutting edges (13) ranges from 108° to 128°, an included angle between the outer cutting edge (11) ranges from 130° to 140°, and an included angle between the inner cutting edge (13) and outer cutting edge (11) ranges from 28° to 40°.

2 Claims, 2 Drawing Sheets

(56) References Cited

OTHER PUBLICATIONS

Ni Zhifu, Chen Biguang, Cluster Drill—Ni-Zhifu Drill, book, 1999, Title Page, Abstract and pp. 213, 215-217, 220 and 221, Shanghai Science and Technology Publishing House, Shanghai, China (p. 213 is the beginning of chapter 4 and is thus not enumerated) (with translation).
Zhou An-Shan, Standardization & Industrialization of Multi-Fork Twist Drill, Journal, Mar. 2008, pp. 12-13, vol. 3, New Technology and New Process, China (with translation).
English translation of Abstract of Chinese Patent Application No. CN201267891.
Ni Zhifu, Chen Biguang, Cluster Drill—Ni-Zhifu Drill, book, 1999, Title Page, Abstract and pp. 213, 215-217, 220 and 221, Shanghai Science and Technology Publishing House, Shanghai, China.†
Zhou An-Shan, Standardization & Industrialization of Multi-Fork Twist Drill, Journal, Mar. 2008, pp. 12-13, vol. 3, New Technology and New Process, China.†

\* cited by examiner
† cited by third party

GENERAL-PURPOSE MULTIPLE-CUTTING EDGE DRILL

CROSS REFERENCE TO RELATED APPLICATIONS

The present application claims the priority of Chinese Patent Application No. 201120243483.X, entitled "General-Purpose Multiple-Cutting Edge Drill", and filed on Jul. 11, 2011, the entire disclosure of which is incorporated herein by reference.

FIELD OF THE INVENTION

The present invention generally relates to a drilling tool, and more particularly, to a general-purpose multiple-cutting edge drill.

BACKGROUND OF THE INVENTION

A multiple-cutting edge drill with a sharp drill point is disclosed in a Chinese patent No. ZL200820165519.5, which has a better centering ability than that of an ordinary multi-facet drill. In addition, by using the multiple-cutting edge drill, a less axial resistance can be achieved.

However, the multiple-cutting edge drill also has the following disadvantages.

In theory, an included angle between two inner cutting edges of the multiple-cutting edge drill can be controlled and does not increase excessively. However, in operation, the included angle between two inner cutting edges ranges from about 124° to about 133°, which means there is still a certain increment of the angle included between the two inner cutting edges, so that promotion of the centering ability of the multiple-cutting edge drill is limited to a certain degree. Moreover, when the multiple-cutting edge drill is used, the axial resistance does not increase excessively, but it still increases to some extent.

A length of a dill point of the multiple-cutting edge drill is less than that of a twist drill so that a drilling process performed to thin-wall materials by using the multiple-cutting edge drill is ended before a countersink with an enough size for centering is formed, which induces a poor stability and bad roundness of holes while drilling sheets or circular pipes.

Although a good performance can be achieved when the multiple-cutting edge drill with the included angle between inner cutting edges ranging from about 124° to about 133° is used to drill holes in hard materials such as drill steel, cast iron, and stainless steel, but a deviation and the bad roundness of holes may be induced when the multiple-cutting edge drill is used to drill holes in materials such as aluminum, wood, and plastic, because the drill point of the multiple-cutting edge drill is not sharp enough so that a guidance capability is poor.

SUMMARY OF THE INVENTION

Embodiments of the present invention provide a general-purpose multiple-cutting edge drill. By using the general-purpose multiple-cutting edge drill, a centering ability can be enhanced and an axial resistance can be reduced. The general-purpose multiple-cutting edge drill not only is applicable to hard materials such as drill steel, cast iron, and stainless steel, but also is applicable to softer materials such as aluminum, wood, and plastic. Moreover, the general-purpose multiple-cutting edge drill not only can be used to drill holes in solid parts, but also can be used to drill holes in pipes and sheets.

In an embodiment, the general-purpose multiple-cutting edge drill includes: a drill point; a drill body connected with the drill point; margins located on an outer wall of the drill body; two lips, wherein, if viewed from an axial direction, from out to inside, each of the two lips successively includes an outer cutting edge, an arc cutting edge and an inner cutting edge; a chisel edge located near a center position of the drill point and between the two inner cutting edges; outer peaks formed by intersection of the outer cutting edges and the arc cutting edges; and a center peak formed by intersection of two inner flank surfaces and two split surfaces. Moreover, an included angle between the inner cutting edges ranges from about 108° to about 128°, an included angle between the outer cutting edges ranges from about 130° to about 140°, and an included angle between the inner cutting edge and the outer cutting edge ranges from about 28° to about 40°.

Optionally, a rake angle of the inner cutting edge ranges from about −5° to about +5°.

Optionally, an included angle between the arc cutting edge and the outer cutting edge ranges from about 130° to about 140°.

Compared with the prior art, the general-purpose multiple-cutting edge drill provided by the present invention has the following advantages:

The included angle between the inner cutting edges ranges from about 108° to about 128° and the included angle between the outer cutting edges ranges from about 130° to about 140°. In other words, the included angle between the outer cutting edges is greater than the included angle between the inner cutting edges, which means a length of the drill point of the general-purpose multiple-cutting edge drill is not less than that of a twist drill. So, if viewed from the axial direction, the general-purpose multiple-cutting edge drill provided by the present invention has a structure with a sharp central part and a blunt peripheral part so that both the centering ability of the drill point and the stability of drilling are promoted, which ensures good roundness and axial straight degree of holes when the holes are drilled in solid parts, sheets and pipes.

The included angle between the outer cutting edges ranging from about 130° to about 140° makes the general-purpose multiple-cutting edge drill applicable to hard materials such as drill steel, cast iron, and stainless steel. And, the included angle between the inner cutting edges ranging from about 108° to about 128° can ensure general-purpose multiple-cutting edge drill provides a sharp drill point and a good centering ability to meet requirements for drilling softer materials such as aluminum, wood, and plastic. Furthermore, because the included angle between the inner cutting edge and the outer cutting edge ranges from about 28° to about 40°, a length of the inner cutting edge is reduced so that a maximum cutting speed of the inner cutting edge is not greater than about ⅓ times that of the outer wall of the general-purpose multiple-cutting edge drill, which ensures an enough intensity can be achieved when the general-purpose multiple-cutting edge drill is used to drill holes in iron and steel. Therefore, in processes for drilling holes in both the hard materials such as drill steel, cast iron, and stainless steel and the softer materials such as aluminum, wood, and plastic, the general-purpose multiple-cutting edge drill can provide a good efficiency and a long lifetime.

As an improvement, the rake angle of the inner cutting edge is configured to range from about −5° to about +5° so that the axial resistance is reduced in drilling operation. Therefore, a comprehensive performance of the general-purpose multiple-cutting edge drill can be promoted.

For further improvement, the included angle between the outer cutting edge and the arc cutting edge is configured to range from about 130° to about 140°. While drilling holes, two symmetrical outer peaks rotate around the center peak, so that the stability of drilling can be enhanced, which induces that a deviation of the drill point and friction between margins and inside walls of holes can be reduced, thereby avoiding uneven wear of the two lips and prolonging the cutting lifetime of the general-purpose multiple-cutting edge drill.

DETAILED DESCRIPTION OF THE EMBODIMENTS

Embodiments of the present invention will be described in detail herein in conjunction with the attached drawings.

Figure 1:
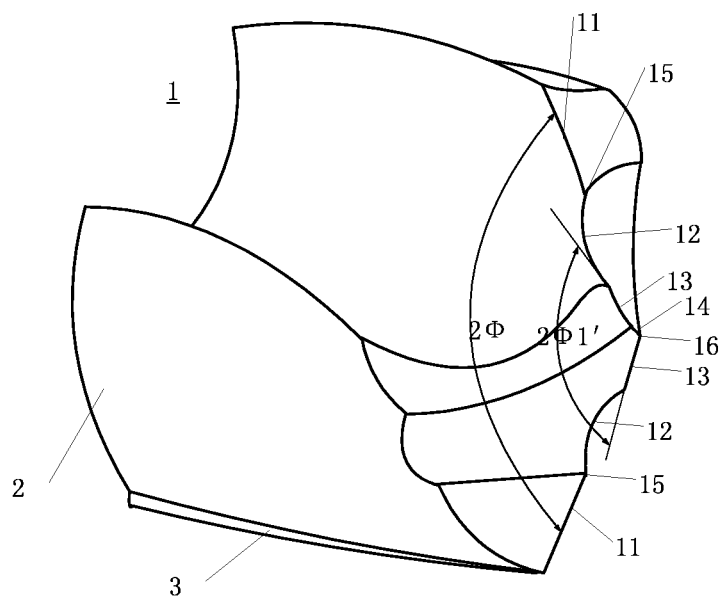
FIG. 1 is a schematic isometric view of a general-purpose multiple-cutting edge drill according to an embodiment of the present invention.
Figure 2:
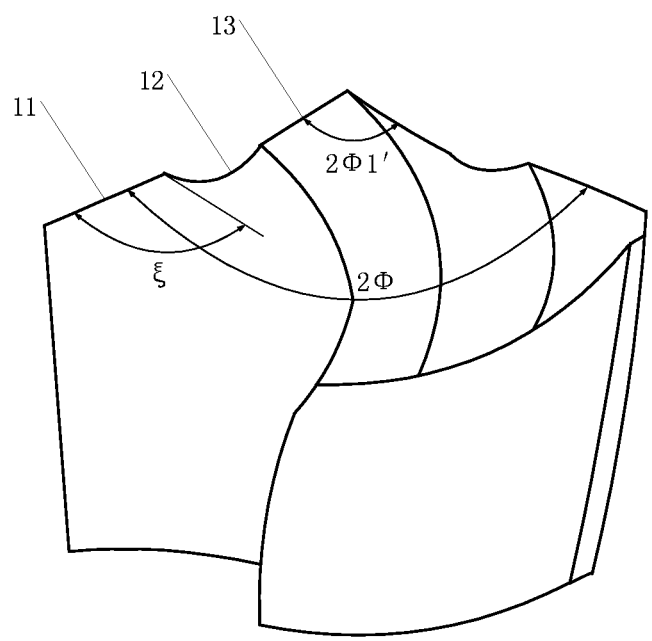
FIG. 2 is a schematic principal view of a general-purpose multiple-cutting edge drill according to the embodiment of the present invention.
Figure 3:
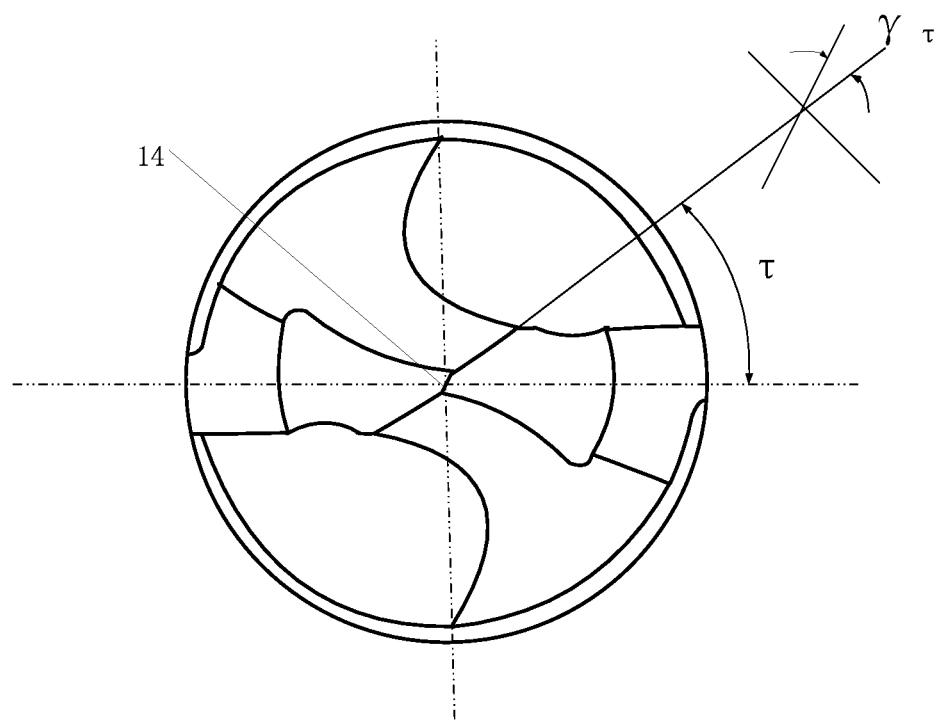
FIG. 3 is a schematic top view of a general-purpose multiple-cutting edge drill according to the embodiment of the present invention; and As shown in the accompanying drawings, the same or similar reference signs represent the same or similar components, for example, a drill point 1, outer cutting edges 11, arc cutting edges 12, inner cutting edges 13, a chisel edge 14, outer peaks 15, a center peak 16, a drill body 2, margins 3, an included angle ξ between the arc cutting edge 12 and the outer cutting edge 11, an included angle 2Φ1' between the inner cutting edges 13, an included angle τ between the inner cutting edge 13 and outer cutting edge 11, an included angle 2Φ between the outer cutting edge 11, and a rake angle γτ of the inner cutting edge 13.

Referring to FIG. 1 to FIG. 3, a general-purpose multiple-cutting edge drill includes: a drill point 1; a drill body 2 connected with the drill point 1; margins 3 located on an outer wall of the drill body 2; two lips, wherein, if viewed from an axial direction, from out to inside, each of the two lips successively includes an outer cutting edge 11, an arc cutting edge 12 and an inner cutting edge 13; a chisel edge 14 located near a center position of the drill point 1 and between the two inner cutting edges 13; outer peaks 15 formed by intersection of the outer cutting edges 11 and the arc cutting edges 12; and a center peak 16 formed by intersection of two inner flank surfaces and two split surfaces. Therefore, the drill point 1 has a structure with three peaks (two outer peaks 15 and a center peak 16) and seven cutting edges (a chisel edge 14, two inner cutting edges, two arc cutting edges and two outer cutting edges).

A difference between the general-purpose multiple-cutting edge drill in the present invention and a conventional drill is that, firstly, in an embodiment of the present invention, an included angle 2Φ1' between the inner cutting edges 13 ranges from about 108° to about 128° and is less than that of a conventional drill, which can reduce an axial resistance in drilling operation. Secondly, an included angle 2Φ between outer cutting edges 11 ranges from about 130° to about 140° and is greater than 2Φ1'. Therefore, the general-purpose multiple-cutting edge drill in the embodiments of the present invention has a drill point 1 with a sharp central part and a blunt peripheral part if viewed from an axial direction, and referring to FIG. 2, a length of the dill point of the general-purpose multiple-cutting edge drill is not less than that of a twist drill, in other words, the center peak of the general-purpose multiple-cutting edge drill coincides with an apex of the included angle between the two outer cutting edges 11, which greatly enhances a centering ability of the general-purpose multiple-cutting edge drill and a drilling stability, thereby ensuring good roundness and axial straight degree of holes and avoiding deviations of the holes. In addition, an included angle τ between the inner cutting edge 13 and the outer cutting edge 11 ranges from about 28° to about 40°.

In light of above analysis, the included angle 2Φ between the outer cutting edges ranging from about 130° to about 140° makes the general-purpose multiple-cutting edge drill applicable to hard materials such as drill steel, cast iron, and stainless steel, the included angle 2Φ1' between the inner cutting edges ranging from about 108° to about 128° can ensure that the general-purpose multiple-cutting edge drill provides the sharp drill point and the good centering ability to meet requirements for drilling softer materials such as aluminum, wood, and plastic. Besides, because the included angle τ between the inner cutting edge 13 and the outer cutting edge 11 ranges from about 28° to about 40°, a length of the inner cutting edge is reduced so that a maximum cutting speed of the inner cutting edge is not greater than about ⅓ times that of the outer wall of the general-purpose multiple-cutting edge drill, which induces that an enough intensity can be achieved when the general-purpose multiple-cutting edge drill is used to drill holes in iron and steel. In conclusion, in operation for drilling holes in both the hard materials such as drill steel, cast iron, and stainless steel and the softer materials such as aluminum, wood, and plastic, the general-purpose multiple-cutting edge drill can provide both a good efficiency and a long lifetime.

In an embodiment, a rake angle $\gamma_\tau$ of the inner cutting edge 13 is configured to range from about −5° to about +5° so that the inner cutting edge 13 is sharper, which induces that the efficiency of drilling is promoted. And an included angle ξ between the arc cutting edge 12 and the outer cutting edge 11 is configured to range from about 130° to about 140° so that the deviation of the drill point and frictions between margins and side walls of a hole can be reduced, which induces that uneven wear of two lips can be avoided and the cutting lifetime of the general-purpose multiple-cutting edge drill can be prolonged.

The general-purpose multiple-cutting edge drill in the embodiments of the present invention is formed by improving the twist drill in the prior art. Specifically, lips of the twist drill in the prior art are changed to be the outer cutting edges 11, the include angle 2Φ between outer cutting edges is configured to range from about 130° to about 140° and have the same size as a center peak angle of the twist drill in the prior art. After the improvement, the general-purpose multiple-cutting edge drill includes the included angle 2Φ1' between the inner cutting edges ranging from about 108° to about 128°, the included angle τ between the inner cutting edge and the outer cutting edge ranging from about 28° to about 40°, and the rake angle $\gamma_\tau$ ranging from about −5° to about +5°.

Although the present invention has been disclosed as above with reference to preferred embodiments, it is not intended to limit the present invention. Those skilled in the art may modify and vary the embodiments without departing from the spirit and scope of the present invention. Accordingly, the scope of the present invention shall be defined in the appended claim.

What is claimed is:

1. A general-purpose multiple-cutting edge drill, comprising:
    a drill point (1);
    a drill body (2) connected with the drill point (1);
    margins (3) located on an outer wall of the drill body (2);
    two lips, wherein, if viewed from an axial direction, from out to inside, each of the two lips successively includes an outer cutting edge (11), an arc cutting edge (12) and an inner cutting edge (13);
    a chisel edge (14) located near a center position of the drill point (1) and between the two inner cutting edges (13);
    outer peaks (15) formed by intersection of the outer cutting edges (11) and the arc cutting edges (12); and
    a center peak (16) formed by intersection of two inner flank surfaces and two split surfaces,
    wherein an included angle ($2\Phi1'$) between the inner cutting edges (13) ranges from 108° to 128°, an included angle ($2\Phi$) between the outer cutting edges (11) ranges from 130° to 140°, and an included angle ($\tau$) between the inner cutting edge (13) and outer cutting edge (11) ranges from 28° to 40°, wherein the included angle ($2\Phi$) between the outer cutting edges (11) is greater than the included angle ($2\Phi1'$) between the inner cutting edges (13), and the outer peak (15) comprises an included angle ($\xi$) between the arc cutting edge (12) and the outer cutting edge (11) ranging from 130° to 140°, the included angle ($\xi$) between the arc cutting edge (12) and the outer cutting edge (11) is equal to the included angle ($2\Phi$) between the outer cutting edges (11),
    wherein the center peak (16) coincides with an apex of the included angle ($2\Phi$) between the outer cutting edges (11).

2. The general-purpose multiple-cutting edge drill according to claim 1, wherein a rake angle ($\gamma_\tau$) of the inner cutting edge (13) ranges from −5° to +5°.

* * * * *